No. 761,193. PATENTED MAY 31, 1904.
A. F. BLANCHARD.
TOOTH BRUSH.
APPLICATION FILED NOV. 3, 1903.
NO MODEL.
Fig. 1.
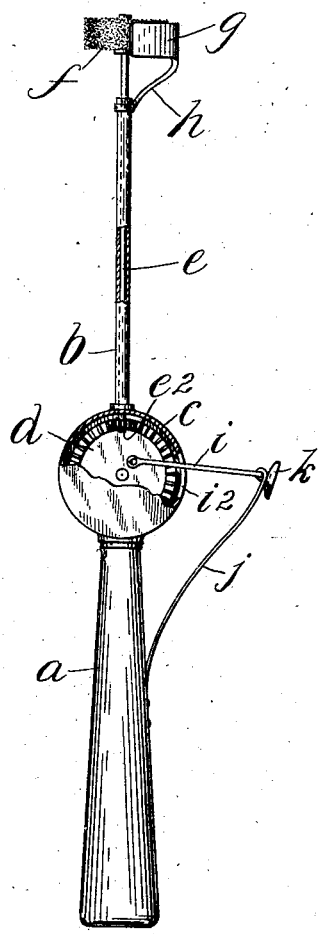
Fig. 2.
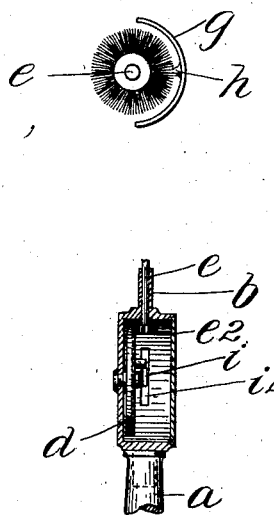
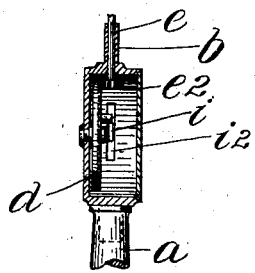
Fig. 3.
WITNESSES
F. A. Stewart
C. E. Mulreany
INVENTOR
BY Adolph F. Blanchard
Edgar Tate & Co
ATTORNEYS No. 761,193. Patented May 31, 1904.

UNITED STATES PATENT OFFICE.

ADOLPH FREDERICK BLANCHARD, OF BROOKLYN, NEW YORK.

TOOTH-BRUSH.

SPECIFICATION forming part of Letters Patent No. 761,193, dated May 31, 1904.

Application filed November 3, 1903. Serial No. 179,656. (No model.)

*To all whom it may concern:*

Be it known that I, ADOLPH FREDERICK BLANCHARD, a citizen of the United States, residing at Brooklyn, in the county of Kings and State of New York, have invented certain new and useful Improvements in Tooth-Brushes, of which the following is a specification, such as will enable those skilled in the art to which it appertains to make and use the same.

This invention relates to tooth-brushes; and the object thereof is to provide an improved device of this class by means of which the inner sides of the teeth may be properly cleaned; and with this and other objects in view the invention consists in a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a sectional side view of my improved tooth-brush; Fig. 2, an end view thereof, and Fig. 3 a view of a part of the device at right angles to that of Fig. 1.

In the practice of my invention I provide a tooth-brush comprising a handle portion $a$, having a tubular shank $b$, between which and the handle is a casing $c$, preferably cylindrical in form, and in which is mounted a gear-wheel $d$. Passing through the tubular shank $b$ is a small shaft $e$, one end of which extends into the casing $c$ and is provided with a small gear-wheel $e^2$, which operates in connection with the gear-wheel $d$, and on the outer end of said shaft is a rotary brush $f$, one side of which is covered or protected by a segmental shield $g$, which is secured to the tubular shank $b$ by an arm $h$.

Eccentrically connected with one side of the gear-wheel $d$ is a rod $i$, which passes through a slot $i^2$ in the casing $c$, and connected with the outer end of this rod is a spring $j$, which is secured to the handle $a$.

In operating this device the brush $f$ is held so that it will press on the inner sides of the teeth either in the top or bottom jaw, and the outer end of the rod $i$ is provided with a thumb or finger piece $k$, and by pressing on said thumb or finger piece the rod $i$ will be forced inwardly, and by releasing said pressure the spring $j$ will draw the rod $i$ outwardly and the brush $f$ will be turned. It will be apparent that this movement may be repeated as rapidly as desired, and in this way the inner sides of the teeth may be thoroughly cleaned. It will also be understood that my improved brush may be used in the manner described for cleaning any parts of the teeth, and by means of my invention I provide a tooth-brush whereby the teeth may be thoroughly cleaned or cleansed at all times and kept in proper order.

It will be observed that the handle $a$ and the tubular shank $b$ are connected with the casing $c$, and this connection may be made in any desired manner, and the object of the shield $g$ is to prevent the brush in its rotation from coming in contact with the mucous membranes of the mouth and injuring the same.

Having fully described my invention, what I claim as new, and desire to secure by Letters Patent, is—

A tooth-brush comprising a handle and tubular shank, a casing placed between the handle and shank and with which said handle and shank are connected, a gear-wheel mounted in said casing, a shaft passing through said shank and geared in connection with said wheel and provided at its outer end with a rotary brush, a spring secured to the handle and provided at its free end with an eye, and a rod passing through said eye into said casing and eccentrically connected with said wheel and provided at its outer end with a knob or head, substantially as shown and described.

In testimony that I claim the foregoing as my invention I have signed my name, in presence of the subscribing witnesses, this 30th day of October, 1903.

ADOLPH FREDERICK BLANCHARD.

Witnesses:
EDMUND MILLER,
LOUIS BLANCHARD, Jr.